United States Patent

Hattori

[11] Patent Number: 5,769,511
[45] Date of Patent: Jun. 23, 1998

[54] CRAWLER TRACK SHOE COVER FOR PROTECTION OF ROAD SURFACES

[75] Inventor: Tomitaro Hattori, Miyazaki, Japan

[73] Assignee: Art Japan Co., Ltd., Miyazaki, Japan

[21] Appl. No.: 677,765

[22] Filed: Jul. 10, 1996

[51] Int. Cl.$^6$ .................................................. B62D 55/275
[52] U.S. Cl. .............................................. 305/51; 305/189
[58] Field of Search ............................... 305/46, 51, 180, 305/187, 188, 189, 39, 190, 185, 200, 201

[56] References Cited

U.S. PATENT DOCUMENTS

| 4,027,925 | 6/1977 | Black et al. | 305/46 |
|---|---|---|---|
| 4,068,905 | 1/1978 | Black et al. | 305/51 |
| 4,109,971 | 8/1978 | Black et al. | 305/51 |
| 4,597,612 | 7/1986 | Kaizaki | 305/51 |
| 5,388,900 | 2/1995 | Suzuki | 305/51 X |

FOREIGN PATENT DOCUMENTS

| 4197693 | 1/1994 | Australia . | |
| 748081 | 6/1933 | France . | |

*Primary Examiner*—Russell D. Stormer
*Attorney, Agent, or Firm*—Weingarten, Schurgin, Gagnebin & Hayes LLP

[57] ABSTRACT

A road surface protection cover for covering the metal blade of a crawler track shoe. The cover comprises a main body (1) and a pair of fixtures 3 and 4 to be fixed on the left and right ends of the main body of the cover. In the interior of the main body 2 of the cover, there are embedded steel pipes 7 and 8 on the sides of fixture 3 and 4, there are side boards 3*a*, 3*b* and 4*a*, 4*b*, there are female screw threads 7*a*, 7*b* and 8*a*, 8*b* in the pipes 7 and 8. Through these bolts 9, 10 and 11,12 penetrate holes 3*a*, 3*b* and 4*a*, 4*b* for screwing purpose. On the faces of the ends there are depression 3*e*, 3*f* and 4*e*, 4*f* to conceal the best threads. In addition, the side boards 3*c* and 4*c* have their interior faces 3*g* and 4*g* formed in taper shape.

14 Claims, 2 Drawing Sheets

CRAWLER TRACK SHOE COVER FOR PROTECTION OF ROAD SURFACES

BACKGROUND OF THE INVENTION

This invention is one which concerns a type of cover of the metal blade which is a component of the crawler track shoes in vehicles for civil construction work such as power shovels and other similiar ones. This cover over the metal serves the purpose of affording protection to the road surface on which the industrial vehicle travels.

There are at present two types of crawler tracks used as components of vehicles for civil construction work, the one with blades made of metal and the other fitted with rubber belt. The former one has very good durability and is tough. For this reason it is mainly used in work sites of dismantling where much stones and steel bars are found. The latter has excellent soft and quietly gentle and pliable characteristics, but the rubber belt of such type is easily damaged. It is, therefore mainly used in work sites where there are many areas in which surfaces are paved.

However, there are work sites which have a mixture of areas with paved surfaces and areas with surfaces on which stones and steel bars are scattered with disorder everywhere. In these work sites, it is rather difficult to use separate vehicles from the two types in one area with different surfaces on the same ground area of a work site.

Owing to the difficulty of using separate vehicles for the same job in the same work site, the conventional practice is unavoidably, therefore, to use mainly one single type of vehicle which is the metal clad crawler one. Vehicle of this type, when travelling in work sites with mixed areas of asphalt paving and/or concrete surfaced roads, have to keep away from such surfaced areas and roads in order that no damage is caused directly by the metal blades to the finished surfaces of such areas and roads.

In order to prevent such damages to the surfaced area, it has been the practice to place timbers and other such materials underneath the metal track blade for the vehicle to ride on.

However, the above stated practice of placing protection timbers etc. under the crawler track shoe is a cumbersome job requiring much manual labour which is one problem.

In addition, for the driver of such vehicle, he has to be extra careful during driving to ensure that the vehicle-moving on the timber bedding does not tread out of such beddings. This kind of driving, consequently, is time consuming which is one more problem.

SUMMARY OF THE INVENTION

Problems under these circumstances requiring a solution, the applicant himself has, therefore, submitted in advance of others his application bearing reference no.HEI-1-83175 of patent for his invention of road surface protecting cover for crawler track shoes.

The road surface protecting crawler track shoe cover has a roughly square pillar shaped main body made of elastic material and it also has a fixture fitted fixedly to both ends of this main body of the cover. That fixture provides a certain space between the cover main body and its bottom.

Thus, such a device composed in the above stated manner achieves the following effects.

This is to say, (a) As the cover can be attached to the metal blade of the crawler track shoe and removed and can be re-attached, so the vehicle, when being in operation over paved surfaces, can have its crawler track shoes fitted with the covers for quiet movement without causing damage to paved surfaces. Crawler track vehicles with originally fitted metal track shoes can now be used in dismantling work sites where there are much broken stones and steel bars by fitting the crawler track shoes with these invented covers.

In this way, this application contains additional improvement to those earlier applications. The improvements are upgradings of durability and closer adhesive to the metal blades of the crawler track shoe. The invention under application is for the purpose of offering an improved crawler track shoe cover for protection of road surfaces.

For this reason, the roughly square pillar shaped main body of the cover has been designed and together with the provision of a fixture to be fixed at each end of the main body. Between the seat of the fixture and the bottom of the cover's main body there is space provided. Furthermore, there are steel tubes embedded in the main body which run through it from one end to the other end. These two fixture are fitted on to each end of the main body at an inclined angle to the faces of the ends.

BRIEF DESCRIPTION OF THE DRAWINGS

The following explains how the cover is actually fitted for use, based on the drawings Diagram 1 is an exploded isometric view of the broken down road surface protective cover for a crawler track shoe.

Diagram 2 is the front view in section of the protective cover.

Figure 1:
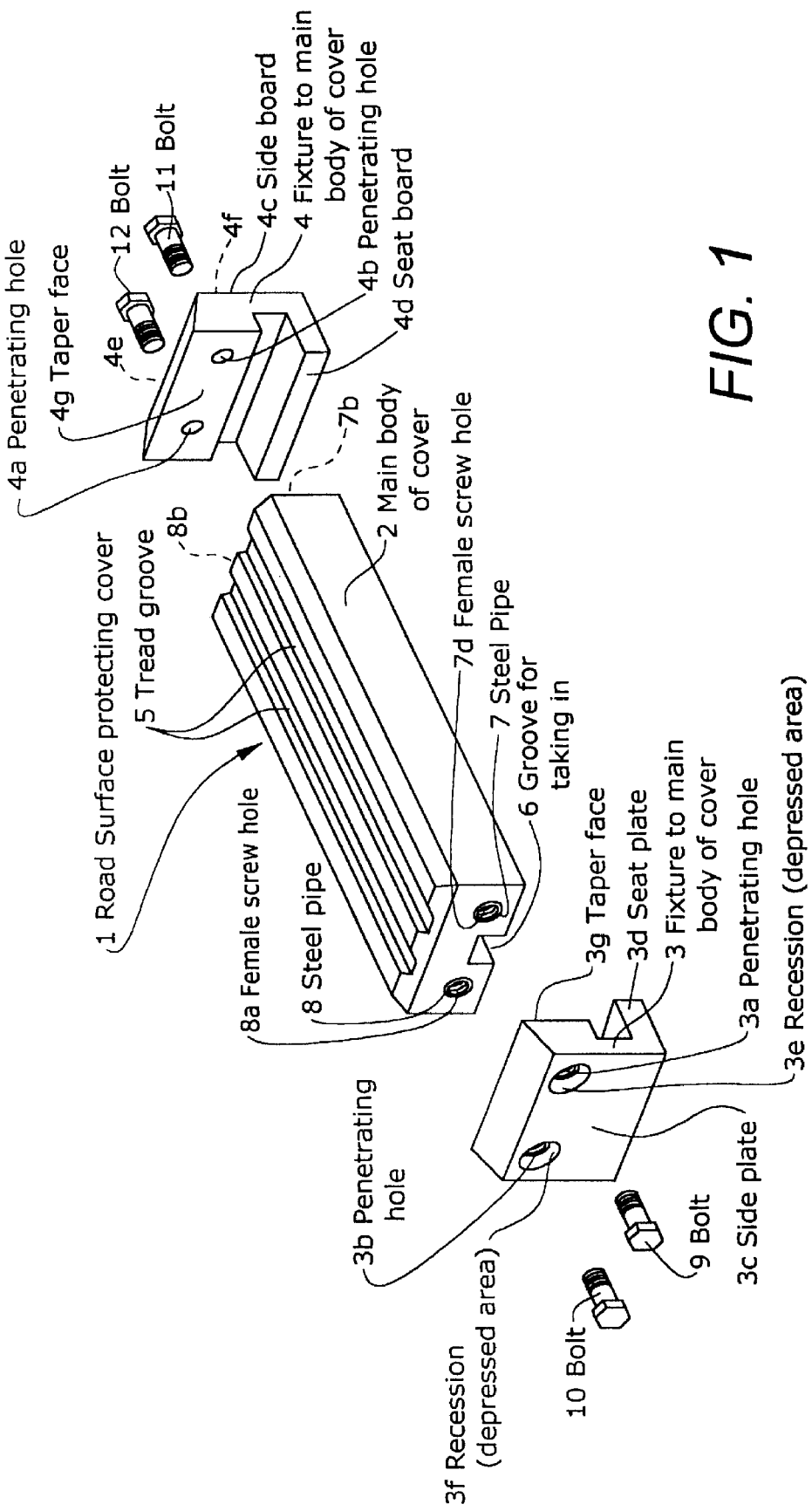
Figure 2:
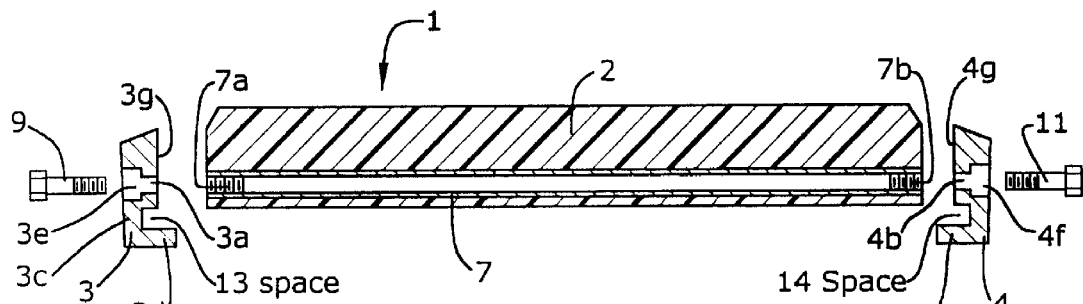
Figure 3:
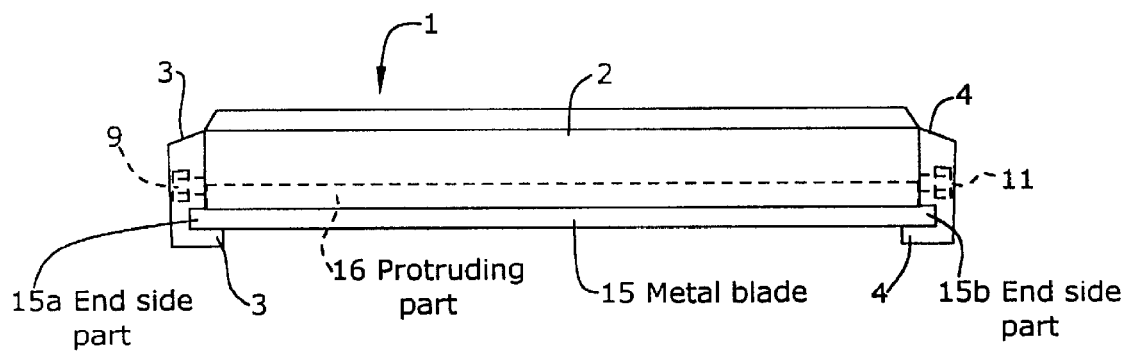
Figure 4:
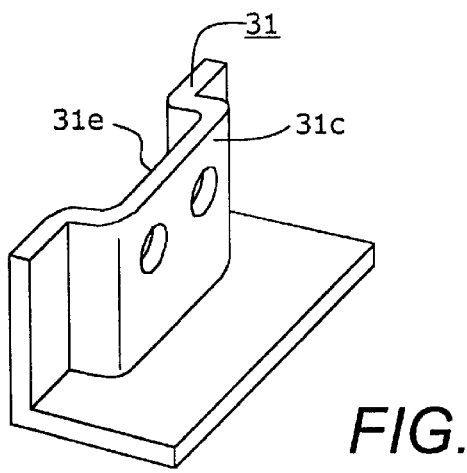

Diagram 3 shows the cover attached to the metal blade.

Diagram 4 shows an isometric view of another embodiment of the fixture to the cover.

DETAILED DESCRIPTION OF THE INVENTION

As shown in Diagram 1 and Diagram 2, this invention for a road surface protection cover 1 is composed of a cover's main body 2 which is a roughly square pillar shaped device made of elastic hard rubber and a pair of fixtures 3 and 4 which are attached to the left end and right end of the cover's main body.

On the main body 2 of the cover, there are grooves 5 which have cross-sectional depressed treads running along longitudinally. In addition, there is the provision of a taking in groove 6 running along the center line longitudinally on the bottom of the main body for fitting the protruding part 16 of the metal blade 15 to be described later on with the abovementioned tread depressions. Groove 6 is shaped with cross-sectional depressor for the purpose of matching the protruding part 16 of metal blade 15.

In addition, in the interior of the main body of the cover, steel pipes 7 and 8 run lengthwise from one end to another end as core stock and include with female screw holes 7a, 7b and 8a, 8b formed at each end of the steel pipes.

The fixtures for main body of cover, the side boards 3c and 4c and seat plate 3d and 4d, all these parts together forming roughly an L shape item which is made of cast aluminium alloy. Then there is provided certain spacings 13 and 14 between seat plates 3d and 4b on the bottom of the cover main body 2 when the fixtures 3 and 4 for the cover of main body are fitted there to. The spacings 13 and 14 are famed with the thickness and lengths of the metal blades which will be mentioned later on. In this manner, there are provided with holes 3a, 3b and 4a, 4b for penetration by the steel pipes 7 and 8 through female holes 7a, 3b and 4a, 4b by bolts 9, 10 and 11, 12.

At the same time, the recessions 3e, 3f and 4e, 4f have been so formed to conceal the heads of screw-matching bolts 9, 10 and 11, 12 inside the side boards 3c and 4c so none of the heads of these bolts can protrude outside.

Furthermore, the interior sides of side boards 3c and 4c have been so formed that their ends are directed to an incline inwards, presenting taper faces 3g and 4g. Thus when fixtures 3 and 4 are fixed to the cover's main body, the seat boards 3d and 4d will incline inwards to the ends of cover's main body 2.

The pair of fixture 3 and 4 formed in the above stated manner are fixed to both ends of the cover's main body by the use of screwed bolts 9, 10 and 11, 12. Thus the metal blade of the track shoe can be gripped within the spaces 13 and 14 between the bottom of cover's main body 2 and seat boards 3d and 4d of the fixture to cover's main body 3 and 4.

Next, explanation is now given as to the method of actual application and the functions of such application.

When a crawler track vehicle is to travel over roads with paved surfaces, the metal blade 15 which is a part making up the crawler track shoe is to be fitted with the road surface protecting cover in order that damage to asphalt and/or concrete surfaces of the roads can be prevented.

The following explains how to fit these protecting covers to the metal blades of the crawler track.

To begin with, fit the protruding area 16 of the metal blade of the crawler track shoe to the groove 6 at the bottom of main body of the cover 2. See that the metal blade 15 is gripped at both side edges 15a and 15b by the fixtures 3 and 4 to the main body of the cover. Then fit the following penetrating pipes and screw threaded bolts into the respective holes and recessions.

Insert the penetrating screw bolts 9 and 10 through the penetrating holes 3a, 3b and 4a, 4b and screw these bolts with the female screw holes 7a, 7b and 8a, 8b at the ends of the steel pipes 7 and 8. By this device, it is possible to prevent damage to paved road surfaces caused by the metal blade of the crawler track shoe of crawling vehicles.

In addition, in this actual application, there are provided bolts 9, 10 and 11, 12 which are screwed into the recessions on 3e, 3f and 4e, 4f on the ends of fixtures 3 and 4. The heads of these bolts are concealed within side boards 3c and 4c. In a further embodiment, as shown in Dia.4, the central part of side plate 31c of fixture 31 to the main body of cover has been subject to bending process which provides a depressed area.

This invention is composed of the above stated devices. To this, further effects have been added on, as described earlier on in (a); the following are its excellent effects.

(1) In the interior of the main body of cover 2, there are steel pipes 7 and 8 embedded as core material. This feature enhances the durability by prevention of twisting and bending effects caused by external forces.

(2) The interior faces 3c and 4c of side boards 3 and 4 are taper formed 3g and 4g. By this taper form, the fitting and adhesion of the road surface protecting cover 1 are improved, with the effect of preventing slippage and detachment.

(3) On the faces 3c and 4c at the ends of fixture 3 and 4 to the main body of the cover, recessions 3e, 3f and 4e, 4f have been provided by forming. Because of such recessions provided, the heads of screwed bolts 9, 10 and 11, 12 are concealed inside side board 3 and 4. Thus there are no protruding head on external faces. With the absence of direct contact between the heads of bolts and road surface, the bolts 9, 10 and 11, 12 are prevented from becoming loosened and/or broken.

BRIEF DESCRIPTION OF THE DRAWINGS (Diagram 1)
This is a diagram showing the components of the invention at an inclined angle of the invention which is a cover used in crawler track shoe for the purpose of affording protection to road surfaces.
(Diagram 2)
This is a diagram showing the front cross-sectional view of the cover used on crawler track shoe for road surface protection.
(Diagram 3)
This is a diagram showing the front view of the road surface protecting cover when having fitted to the metal blade.
(Diagram 4)
This is a diagram showing the view at an inclined angle of a case of another example of using the fixture to the main body of the cover.
(Explanation of symbols)
1. Road surface protecting cover
2. Main body of cover
3. Fixture to main body of cover
3a. Penetrating hole
3b. Penetrating
3c. Side plate
3d. Seat plate
3e. Recession (depressed area)
3f. Recession (depressed area)
3g. Taper face
4. Fixture to main body of cover
4a. Penetrating hole
4b. Penetrating hole
4c. Side board
4d. Seat board
4e. Recession (depressed area)
4f. Recession (depressed area)
4g. Taper face
5. Tread groove
6. Groove for taking in
7. Steel pipe
7a. Female screw hole
7b. Female screw hole
8. Steel pipe
8a. Female screw hole
8a. Female screw hole
9. Bolt
10. Bolt
11. Bolt
12. Bolt
13. Space
14. Space
15. Metal blade
15a. End side part
15b. End side part
16. Protruding part

What is claimed is:
1. A road surface protection cover for a crawler track shoe, comprising:
an elongated main body having an outer road-contacting surface, an inner track-shoe-contacting surface having a groove formed therein and configured to receive a blade of a track shoe, and opposed end faces, the main body formed of an elastomeric material;

first and second end fixtures fastened to the opposed end faces of the main body, each of the first and second end fixtures comprising a side plate having an inner surface disposed against an associated end face of the main body and a recess formed in the inner surface of the side plate located and configured to receive an end of the blade of the track shoe, the inner surface of the side plate above the recess being acutely angled with respect to the seat plate.

2. The road surface protection cover of claim 1, wherein each of the first and second end fixtures further comprises a seat plate extending from a lower portion of the side plate to underlie a portion of the end of the blade of the track shoe.

3. The road surface protection cover of claim 2, wherein the blade-receiving recess is formed between the seat plate and an inner surface of the side plate of each of the first and second end fixtures.

4. The road surface protection cover of claim 1, wherein the main body includes a reinforcing member disposed in an interior region of the main body.

5. The road surface protection cover of claim 1, wherein the reinforcing member comprises a metal pipe.

6. The road surface protection cover of claim 1, wherein the main body includes a pipe member extending from the opposed end faces through the interior of the main body, the pipe being threaded on ends thereof to receive threaded fastening members, and wherein each of the first and second end fixtures includes an opening therein sized to receive an associated one of the fastening members and located to align with the pipe, whereby the fastening members fastened the first and second end fixtures to the opposed end faces of the main body.

7. The road surface protection cover of claim 6, wherein the first and second end fixtures include recesses formed in outer surfaces thereof to conceal heads of the fastening members.

8. The road surface protection cover of claim 1, wherein the first and second end fixtures are formed of metal.

9. The road surface protection cover of claim 8, wherein the first and second end fixtures are formed of a cast aluminum alloy.

10. The road surface protection cover of claim 1, wherein the main body is formed of rubber.

11. The road surface protection cover of claim 1, wherein the outer road-contacting surface is grooved.

12. A cover for a crawler track shoe, comprising:

an elongate body of an at least substantially elastic material;

fixture means securable to each end of the body for engaging the shoe;

each of the fixture means comprising an inside face and a seat plate forming a substantially L-shaped member;

wherein the inside face is tapered to allow the seat plate of the fixture means to incline towards the body when secured thereon to thereby grip the shoe between an end portion of the seat plate and the body.

13. The cover of claim 12, wherein the body includes elongate reinforcement means running longitudinally therethrough.

14. The cover of claim 13, further comprising fastening means for securing each of the fixture means to the body, wherein the fastening means is at least substantially recessed into the fixture means when secured to the body.

* * * * *

UNITED STATES PATENT AND TRADEMARK OFFICE
CERTIFICATE OF CORRECTION

PATENT NO. : 5,769,511
DATED : June 23, 1998
INVENTOR(S) : Tomitaro Hattori

It is certified that error appears in the above-identified patent and that said Letters Patent is hereby corrected as shown below:

In the Abstract, line 11, "best threads" should read --bolt heads--.

Column 2, line 16, "designed and together with" should read --designed together with--.

Column 2, line 31, "in section" should read --in cross section--.

Column 2, line 53, "depresscr" should read --depression--.

Column 2, line 57, "include with female" should read --include female--.

Column 2, line 59, "The fixtures for main body of cover," should read --The fixtures 3, 4 for the main body of the cover include--.

UNITED STATES PATENT AND TRADEMARK OFFICE
CERTIFICATE OF CORRECTION

PATENT NO. : 5,769,511
DATED : June 23, 1998
INVENTOR(S) : Tomitaro Hattori

It is certified that error appears in the above-identified patent and that said Letters Patent is hereby corrected as shown below:

Column 2, line 66 "famed" should read --formed--.

Column 3, line 18, "bottom of cover's" should read --bottom of the cover's--.

Column 3, line 19, "cover's" should read --the cover's--.

Signed and Sealed this

Fourteenth Day of December, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO  : 5,769,511
DATED      : June 23, 1998
INVENTOR(S): Tomitaro Hattori

It is certified that error appears in the above-identified patent and that said Letters Patent is hereby corrected as shown below:

Column 2, line 61, "roughly an L shape" should read
—roughly an L shaped"

Signed and Sealed this

Seventeenth Day of October, 2000

Q. TODD DICKINSON

*Attest:*

*Attesting Officer*       *Director of Patents and Trademarks*